(12) United States Patent
Watson et al.

(10) Patent No.: US 8,958,557 B2
(45) Date of Patent: *Feb. 17, 2015

(54) SYSTEMS AND METHODS FOR PROTECTING INFORMATION

(75) Inventors: Joseph Watson, Alpharetta, GA (US); Damian Smith, Espom (GB); Robert John Barnes, Watford Herts (GB)

(73) Assignee: Verint Americas Inc., Alpharetta, GA (US)

( * ) Notice: Subject to any disclaimer, the term of this patent is extended or adjusted under 35 U.S.C. 154(b) by 294 days.

This patent is subject to a terminal disclaimer.

(21) Appl. No.: 12/768,194

(22) Filed: Apr. 27, 2010

(65) Prior Publication Data

US 2010/0202611 A1 Aug. 12, 2010

Related U.S. Application Data

(63) Continuation of application No. 11/395,514, filed on Mar. 31, 2006, now Pat. No. 7,774,854.

(51) Int. Cl.
| | |
|---|---|
| *H04L 29/06* | (2006.01) |
| *H04L 12/24* | (2006.01) |
| *G06F 21/62* | (2013.01) |
| *H04L 12/66* | (2006.01) |
| *H04M 1/64* | (2006.01) |
| *H04M 1/656* | (2006.01) |
| *H04M 3/523* | (2006.01) |

(52) U.S. Cl.
CPC .......... *H04L 41/046* (2013.01); *G06F 21/6209* (2013.01); *G06F 21/6245* (2013.01); *H04L 63/0428* (2013.01); *G06F 2221/2101* (2013.01); *G06F 2221/2149* (2013.01)
USPC ............................... 380/210; 726/26; 726/27

(58) Field of Classification Search
CPC ....................................................... G06F 21/10
See application file for complete search history.

(56) References Cited

U.S. PATENT DOCUMENTS

| | | | | |
|---|---|---|---|---|
| 7,315,829 | B1 * | 1/2008 | Tagawa et al. | 705/26.1 |
| 7,487,368 | B2 * | 2/2009 | Inomata et al. | 713/194 |
| 8,060,364 | B2 * | 11/2011 | Bachar et al. | 704/231 |
| 2002/0162058 | A1 * | 10/2002 | Sinquin et al. | 714/699 |
| 2003/0231769 | A1 * | 12/2003 | Bolle et al. | 380/210 |
| 2004/0017914 | A1 * | 1/2004 | Tada | 380/201 |
| 2004/0156616 | A1 * | 8/2004 | Strub et al. | 386/46 |
| 2004/0260876 | A1 * | 12/2004 | Singh et al. | 711/117 |
| 2005/0004922 | A1 * | 1/2005 | Zernik | 707/100 |
| 2005/0286686 | A1 * | 12/2005 | Krstulich | 379/32.01 |
| 2006/0075228 | A1 * | 4/2006 | Black et al. | 713/167 |
| 2006/0078273 | A1 * | 4/2006 | Fredlund et al. | 386/46 |
| 2007/0206765 | A1 * | 9/2007 | Shaffer et al. | 379/265.01 |
| 2008/0040110 | A1 * | 2/2008 | Pereg et al. | 704/236 |

OTHER PUBLICATIONS

Adams, "Battling the Lesser-Known Threat of Call Center Hacking", Sep. 28, 2012, http://www.americanbanker.com/issues/177_189/battling-the-lesser-known-threat-of-call-center-hacking-1053122-1.html.*

* cited by examiner

*Primary Examiner* — Shin-Hon Chen
(74) *Attorney, Agent, or Firm* — Meunier Carlin & Curfman

(57) ABSTRACT

Systems and methods for protecting information provided to an agent via a communication network are provided. In this regard, a representative method comprises, receiving information related to a transaction, wherein the information includes video. Additionally, the method includes initiating a recording of the video and identifying visual content in the video that is to be protected. The method further comprises preventing unauthorized access to the visual content during replay of the recording of the video.

19 Claims, 3 Drawing Sheets

US 8,958,557 B2

SYSTEMS AND METHODS FOR PROTECTING INFORMATION

RELATED APPLICATIONS

This application is a continuation application of and claims priority to U.S. patent application Ser. No. 11/395,514, titled SYSTEMS AND METHODS FOR PROTECTING INFORMATION, filed on Mar. 31, 2006, and which is hereby incorporated by reference in its entirety. No new matter has been added.

TECHNICAL BACKGROUND

Contact centers are staffed by agents that facilitate various transactions with customers. By way of example, a customer may contact a contact center by phone, with the phone call being routed to an agent for handling. After the phone call is routed to the agent, the agent and customer can interact to facilitate a transaction. For instance, the customer may express a desire to purchase a product that is being offered for sale. Notably, various forms of information, such as product name and price, typically are communicated during this interaction. More importantly, however, more sensitive information also is communicated. In particular, personal information related to the customer, such as name and address, could be communicated. In addition, the customer's social security number and/or credit card numbers also could be communicated.

Overview

In this regard, systems and methods for protecting information, which may be sensitive or secure information, provided to an agent via a communication network are provided. Such information can be provided via voice dialog, and/or derived from screen events and data, stored CRM data, stored IVR data, CTI events and data, D-channel events, chat and messenger text, and/or video. A representative embodiment of such a method comprises: receiving a communication via a communication network, the communication including information that is to be protected; routing the communication to an agent; recording at least a portion of the communication; identifying the information that is to be protected from the communication; and preventing unauthorized access to the information (via replay or other access method, such as automated analysis, and/or applying security measures or masking) of the portion of the communication.

A representative embodiment of a system comprises a communication monitoring system and a recording device. The communication monitoring system is operative to monitor a communication via a communication network and identify information contained in the communication that is to be protected. The recording device is operative to record at least a portion of the communication. Additionally, the communication monitoring system is further operative to provide instructions to the recording device responsive to identifying the information such that unauthorized access to the information is prevented of the portion of the communication that was recorded by the recording device.

Computer-readable media also are provided, a representative embodiment of which has a computer program stored thereon. The computer program comprises computer-executable instructions for performing a computer-executed method for protecting information provided to an agent via a communication network. The method comprises: receiving a communication via a communication network, the communication including information that is to be protected; identifying the information that is to be protected from the communication; recording at least a portion of the communication; preventing unauthorized access to the information such that, if it is determined that the information that is to be protected has been recorded, at least a portion of the information is rendered unintelligible to a user unless that user possesses an authorization to access the information.

In a further embodiment, a method is provided for protecting recorded content. The method comprises receiving information related to a transaction, wherein the information includes video. Additionally, the method includes initiating a recording of the video and identifying visual content in the video that is to be protected. The method further comprises preventing unauthorized access to the visual content during replay of the recording of the video.

In an additional embodiment, a monitoring system for protecting recorded content is provided. The system comprises a communication interface configured to receive information related to a transaction, wherein the information includes video. The system further includes a processor configured to initiate a recording of the video, and identify visual content in the video that is to be protected. The processor is also configured to prevent unauthorized access to the visual content during replay of the recording by modifying the visual content to produce modified visual content.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

DETAILED DESCRIPTION

As will be described in detail herein, systems and methods for protecting information provided to an agent via a communication network are provided. In this regard, such systems and methods can potentially prevent unauthorized access to information provided by a customer during interaction with an agent of call center. In some embodiments, this can be accomplished by selectively terminating recording of such communications during times when information that is to be protected is communicated to the agent. Additionally, or alternatively, responsive to such information being recorded, at least a portion of that information can be modified so that only those users who are authorized access to such information are provided with the information in an intelligible format. By way of example, some embodiments can modify the information that was recorded by deleting, obfuscating, masking and/or encrypting at least a portion of the information.

As used herein, the phrase "information that is to be protected" can be broadly defined as information that would be considered sensitive to a customer. This can include security data, which includes social security numbers and credit card information. Notably, credit card information can include credit card numbers and credit card security data, such as CVV data, which is oftentimes located on the back of a credit card.

Figure 1:
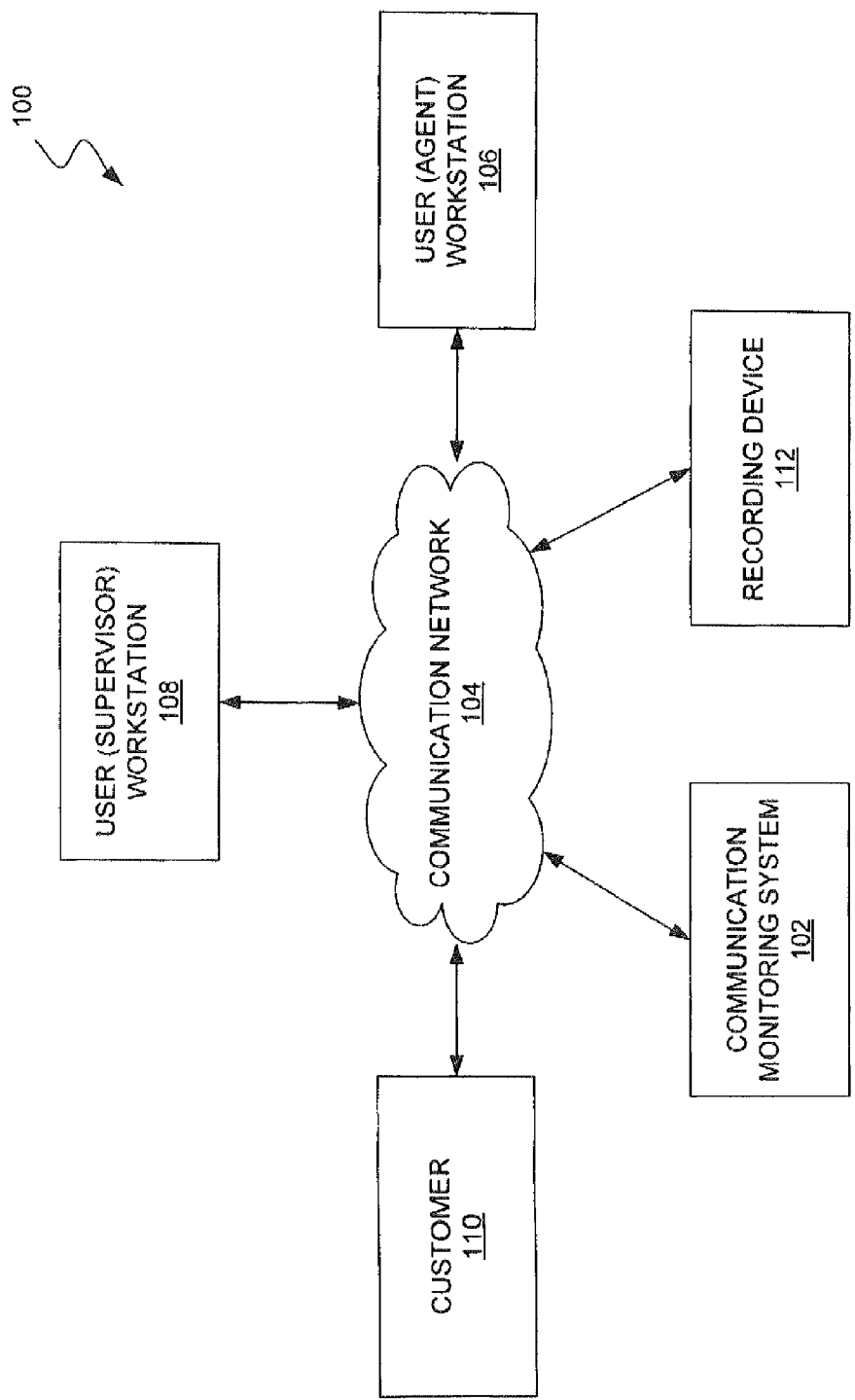
FIG. 1 is a schematic diagram depicting an embodiment of a system for protecting information.

Referring in detail to the drawings, FIG. 1 is a schematic diagram of an embodiment of a system for protecting information. As shown in FIG. 1, system 100 incorporates a communication monitoring system 102 that receives communications provided by a communications network 104. Notably, communications network 104 can be any or a combination of network types (e.g., PSTN, WAN, LAN, the Internet) for communicating various formats (e.g., analog telephone signals, Voice over Internet Protocol (VoIP)) of information.

System 100 also incorporates user workstations, in this case, an agent workstation 106 and a supervisor workstation 108. Each workstation can include a computer and a telephone. In particular, the agent workstation 106 is operative to run various applications, such as those that enable an agent to access information for interacting with a customer 110.

Additionally, system 100 incorporates a recording device 112. The recording device receives information for recording as instructed by the monitoring system 102 as will be described below.

The monitoring system is operative to receive information corresponding to communications that are received from the communication network, such as those received from a workstation and/or a customer. The monitoring system then directs the recording of the information based on a set of rules that can be stored in a database associated with the monitoring system. In particular, based on an analysis of the received communications with respect to the rules, the monitoring system can be configured to provide instructions to the recording device to control start/stop break recording functions of the recording device. It should be noted that more than one recording device can be used in some embodiments, with the recording functions of each of the recording devices being potentially directed by the monitoring system.

Although the communications depicted in FIG. 1 are shown as being provided directly to monitoring system 102 from the communications network, the monitoring system may receive the information indirectly. By way of example, the information could be provided to the monitoring system by another component, e.g., a component that provides a copy of the communication to the monitoring system. Thus, it should be noted that systems for protecting information (such as the system 100) could include various components that are not shown in FIG. 1, e.g. servers and switches, with such various components being omitted for ease of description.

Figure 2:
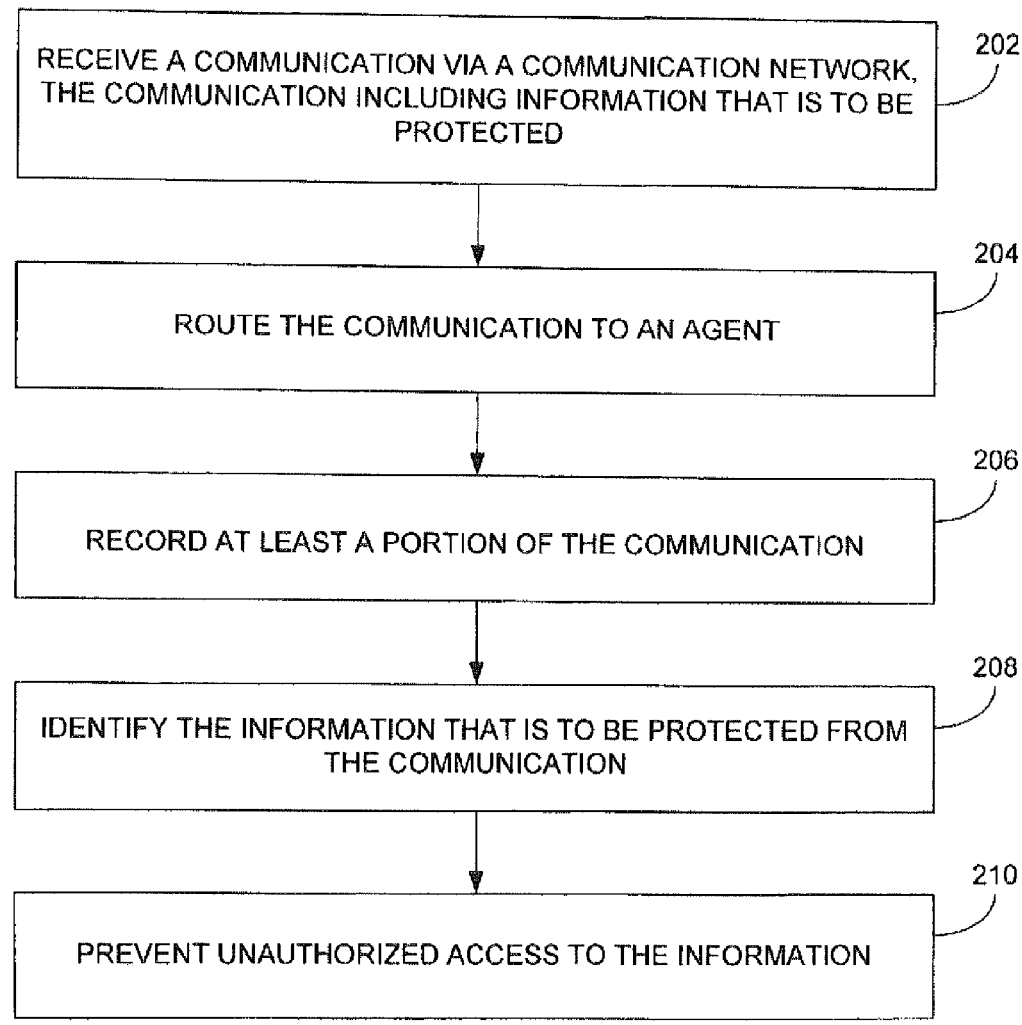
FIG. 2 is a flowchart depicting functionality (or method steps) performed by an embodiment of a system for protecting information.

Functionality of an embodiment of a system for protecting information (such as depicted in FIG. 1) will now be described with reference to FIG. 2. As shown in FIG. 2, the functionality (or method) may be construed as beginning at block 202, where a communication is received via a communication network. Specifically, the communication includes information that is to be protected, and could correspond to a communication between a customer and an agent of a call center, for example. In block 204, the communication is routed to an agent. In block 206, at least a portion of the communication is recorded. As will be described in detail later, the portion of the communication that is recorded mayor may not include at least a portion of the information that is to be protected. In block 208, the information that is to be protected is identified from the communication. Thereafter, such as depicted in block 210, unauthorized access to the information is prevented, such as during replay of the portion of the communication that was recorded.

As will be described in greater detail hereafter, various and/or combinations of methodologies may be used to ensure that information is protected. In particular, these methodologies can include, but are not limited to: analyzing a communication and selectively not recording at least a portion of the information that is to be protected; analyzing a communication and selectively recording at least a portion of the communication such that at least a portion of the information that is to be protected is not recorded; deleting at least a portion of the information that is to be protected prior to storing corresponding data in long term storage; after storing corresponding data in long term storage, deleting at least a portion of the information that is to be protected from long term storage; modifying at least a portion of the information that is to be protected such that at least a portion of the information is unintelligible to a user unless that user possesses an authorization to access the information; manually, selectively recording or not recording the communication to prevent recording of at least a portion of the information that is to be protected; and manually or automatically, tagging portion(s) of a communication to have security applied to the tagged portion(s) (such as silencing, masking, encryption, and/or immediate, e.g., real-time, or delayed overwrite or removal of the tagged portions), thereby eliminating the need to break or suspend recording and thereafter stitch segments of the communication together.

Thus, the various methodologies for protecting information can be generally categorized in one of the following groups; namely, 1) those methodologies that operate to ensure that at least part of the information is not or will not be committed to long term storage, 2) those methodologies that operate to modify at least a portion of the information that is or will be committed to long term storage, and 3) those methodologies that operate to tag certain portion(s) of a communication and to apply security to the tagged portion(s).

Figure 3:
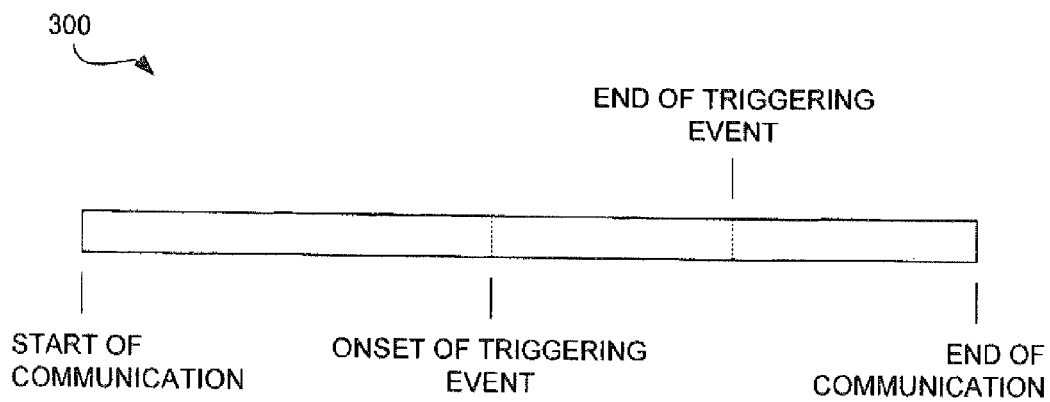
FIG. 3 is a schematic diagram depicting a communication and select functionality implemented by an embodiment of a system for protecting information with respect to the communication.

In general, the ability to protect information corresponding to a communication can be based, at least in part, upon the occurrence of various triggers. By way of example, reference is made to the schematic diagram of FIG. 3, which depicts a communication. As shown in FIG. 3, communication 300, e.g., a telephone call, has a start and an end, with the length of the communication being indicative of the time duration of the communication. Communication 300 also exhibits a triggering event, the onset and end of which are depicted. By analyzing the communication (various methods of which will be described later), the onset of the triggering event can be identified. Responsive thereto, information corresponding to the communication between the onset and the later-identified end of the triggering event, for example, can be protected.

As mentioned above, various methodologies for protecting information can be used. In this regard, several methodologies that do not commit at least a portion of the information to long term storage will now be described in greater detail. Specifically, some embodiments are configured to determine whether information contained in a communication is to be captured for recording. Various triggers, e.g., events, can be used to facilitate such a determination. For instance, voice recognition techniques can be utilized to determine whether information will be or is being provided by the communication. In this regard, a voice recognition algorithm could determine whether one or more of various "hotwords" have been communicated. Responsive to determining that one or more hot words have been communicated, capturing of information could be suspended. Such could be the case in embodiments that are configured to capture information unless recording is suspended. Alternatively, in embodiments that typically do not capture information unless prompted to do so, responsive to one or more hot words, capturing of information could be started. Succinctly, the above described a dialog focus embodiment in which voice/audio is filtered to determine whether to start recording, stop recording, suspend recording, resume recording, blank recording, scramble recording, and/or insert silence into the recording if secured information are communicated.

Additionally, or alternatively, various other events, such as desk top events monitored at an agents workstation (e.g., screen data), application events involving monitoring agent activity (e.g., application focus events and data), CRM events and data, and CTI events or CTI data, which involves monitoring of data that was captured, can be used. For example, an agent entering a specific page within an application that requires the entering of a person's social security number may trigger the system to stop recording either or both of the audio and the desktop video. In an enhancement, the text on the agent's screen may drive the voice recognition filter or dialog focus triggers.

Thus, based upon the occurrence of one or more triggers, which may be initiated triggers or timed triggers, at least a portion of the information that is to be protected will not be available for accessing because that information is not retained in a long term storage memory device. This could provide an improved level of protection for such information since not all of the information that was communicated to the agent will be available for subsequent access.

It should be noted that the use of various triggers can be used prior to committing the information that was captured to long term storage or after the information has been committed to long term storage. That is, in some embodiments, although communications could be analyzed to determine whether any triggers have occurred in real time, additionally or alternatively, such analysis could occur after the information has been captured. By way of example, such analysis could occur after the information has been placed in a buffer, but prior to the information being committed to long term storage. In such embodiments, the information in the buffer could be analyzed for triggers, and any information that should not be committed to long term storage that is found in the buffer could be deleted and/or modified. Such could also be the case when information has been committed to long term storage. That is, the information committed to long term storage could additionally or alternatively be analyzed for triggers, the discovery of which could cause the system to delete or otherwise modify any information that is to be protected. Thus, in some embodiments, monitoring systems can perform real-time processing and/or subsequent screening of information.

In at least some embodiments that delete information that has been captured, stitching can be used. In particular, a portion of a recording that preceded the deleted information can be stitched together with a portion of the recording that succeeded the information. This can result in a relatively seamless recording that can save memory capacity.

With regard to stitching, some embodiments can, for example, stitch the segments together with no gap at replay, stitch the segments together with a gap at replay (or showing a gap), stitch the segments together with alternative content at replay (such as silence or other identifiers to signify that secured information has not been recorded and/or deleted and/or is protected from replay). For example, such a system may also provide indication between the stitched sides, which can be for example, two or more sides, that would provide indication to a user that something was removed for security purposes. In some embodiments, the event identifiers may be represented with a tone or silence in case of audio, or an image or logo in the case of video/screen capture.

As mentioned above, information pertaining to a communication can be captured for subsequent analysis and use. In this regard, such information can include audio corresponding to the communication, screen displayed to the agent that is handling the communication and various CTI and/or other status indicators present during the communication.

With respect to modification of information that is to be protected, such modification can occur in various manners, including those which involve different times for performing the modification and different types of modification. With respect to the time of modification, such modification can occur essentially contemporaneously with the capture of the information up to and including a time that the information is to be accessed and provided to a user, such as in the form of a replay of the information. Notably, if the information is to be modified for the purpose of replay, some embodiments can be configured to modify the contents of the information in long term storage responsive to access being requested. Alternatively, a copy of the information can be modified so that the copy of the information is presented to the user in a modified format, with the information in long term storage being unaltered.

Irrespective of the particular time at which the information is modified, various types of modification can be used. Generally, these types of modification include masking, obfuscating, encrypting and deleting at least a portion of the information.

With respect to the masking of information, various types of masking can be used. In particular, the type of masking utilized depends, at least in part, upon the format of the information that is to be masked. By way of example, when the information is audio content, masking can involve replacing at least a portion of the audio content with silence. However, when the information that is to be protected is included in a screen shot from an agent workstation, visual masking techniques, such as overlaying an opaque graphic, can be used to visually obscure at least a portion of the information that is to be protected.

With respect to modification by encryption, both audio content and visual content (e.g., screen shots) can be encrypted. Encryption can be accomplished by many different types of cryptography techniques, which may include, for example, one-way hashes (hashed indexes) such as SHA-1; truncation; index tokens and PADs, with the PADs being securely stored; or strong cryptography, such as Triple-DES 128-bit or AES 256-bit with associated key management processes and procedures.

It should be noted that in some embodiments, communications and/or agent activity may not only be monitored by a monitoring system for the purpose of identifying information that is to be protected, communications and/or agent activity can also be monitored by a supervisor for quality assurance purposes, for example. In such embodiments, various techniques can be employed for ensuring that information that is to be protected does not circumvent various protective schemes by being routed to a supervisor for monitoring. By way of example, in some embodiments, a supervisor may be able to monitor a communication remotely and have access to the same information to which the agent has access. In some of these embodiments, the information provided for supervisor monitoring is subsequently deleted such that no additional copies of the information are available. In other embodiments, the information provided to the supervisor for monitoring can be in a format that contains less information than is provided to the agent. By way of example, the information can be provided to the supervisor in a format that corresponds to the manner in which the information would be presented to the supervisor during a replay. As mentioned before, the information provided for such a replay could be modified to prevent unauthorized access to the information that is to be protected. Notably, however, up to all the information that has been modified for replay could be reconfigured to be provided to a user in an intelligible format. In this case, if the supervisor is authorized access to the information, the information could be provided to the supervisor for monitoring in an intelligible format.

For those embodiments that modify information for the purpose of protecting that information, such activities could be logged to provide an audit trail. Such an audit trail could be particularly useful in those embodiments that delete information so that the information is no longer accessible. By way of example, various activities associated with the recording and/or modification of information can be provided as details that are saved as data entries. These data entries can then be correlated with the recorded information. By way of example, the audit details could include, but are not limited to: capture identification of a user initiating or causing an event, the type of event that occurred, the date and time that the event occurred, the success or failure of the event, and the identity of the system/resource affected by the event. With respect to such events, such events could include, but are not limited to: a user's act of viewing captured content or metadata associated with content, a user's act of changing attributes or for adding attributes to captured content, a user's act of changing a configuration setting, failed or successful authentication activity, changes to a user account, access to a system audit log, modifications to any business rules (such as the rules used to implement recording or non-recording), and evaluation activities.

Notably, with respect to any information that is recorded, various security techniques can be used to ensure that the stored information is not tampered with or somehow altered once storage and/or modification of the information has taken place. In this regard, some embodiments can incorporate watermarking and/or fingerprinting techniques to ensure that the information is not altered. Watermarks and/or fingerprints can be used to validate the integrity of the captured content to the user at a later date.

Figure 4:
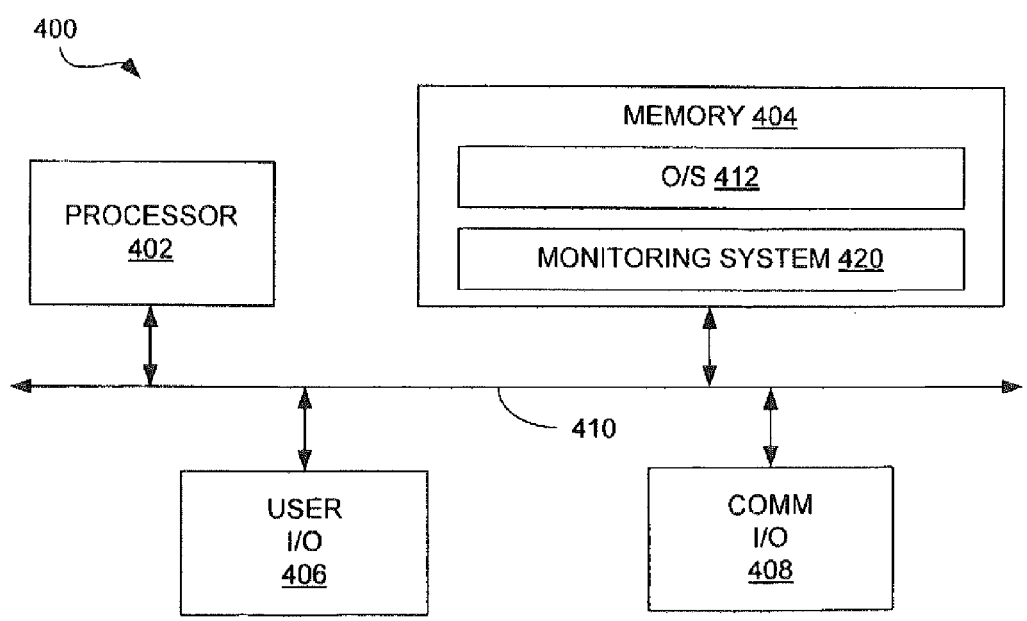
FIG. 4 is a schematic diagram of a computing device that can be used to implement an embodiment of a system for protecting information.

FIG. 4 is a schematic diagram illustrating an embodiment of a computing device that is configured to perform the functionality associated with an embodiment of a monitoring system. Generally, in terms of hardware architecture, computer 400 includes a processor 40~, memory 404, a user interface 406, and one or more input and/or communication (I/O) device interface(s) 408 that are communicatively coupled via a local interface 410. The local interface can include, for example but not limited to, one or more buses or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor 402 may be a hardware device for executing software, particularly software stored in memory 404. In this regard, the processor can be any custom made or commercially available processor, a central processing unit (CPU), an auxiliary processor among several processors associated with the recorder, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard® Company, an 80x86 or Pentium® series microprocessor from Intel® Corporation, a PowerPC® microprocessor from IBM®, a Sparc® microprocessor from Sun Microsystems®, Inc, or a 68xxx series microprocessor from Motorola® Corporation.

The memory 404 can include anyone or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remote from one another, but can be accessed by the processor. Additionally, the memory can include an operating system 412, as well as instructions associated with a monitoring system 420.

The software in memory may include one or more separate programs, each of which includes an ordered listing of executable instructions for implementing logical functions. In this regard, a non exhaustive list of examples of suitable commercially available operating systems is as follows: (a) a Windows® operating system available from Microsoft® Corporation; (b) a Netware® operating system available from Novell®, Inc.; (c) a Macintosh® operating system available from Apple® Computer, Inc.; (d) a UNIX operating system, which is available for purchase from many vendors, such as the Hewlett-Packard® Company, Sun Microsystems®, Inc., and A T&T® Corporation; (e) a LINUX operating system, which is freeware that is readily available on the Internet 100; (f) a run time Vxworks® operating system from WindRiver® Systems, Inc.; or (g) an appliance-based operating system, such as that implemented in handheld computers or personal data assistants (PDAs) (e.g., PalmOS® available from Palm® Computing, Inc., and Windows CE® available from Microsoft® Corporation). The operating system can be configured to control the execution of other computer programs and provides scheduling, input-communication control, file and data management, memory management, and communication control and/or related services.

It should be noted that a system component embodied as software may also be construed as a source program, executable program (object code), script, or any other entity comprising a set of instructions to be performed. When constructed as a source program, the program is translated via a compiler, assembler, interpreter, or the like, which mayor may not be included within the memory, so as to operate properly in connection with the operating system.

When the computing device 400 is in operation, the processor is configured to execute software stored within the memory, to communicate data to and from the memory, and to generally control operations of the recorder pursuant to the software. Software in memory, in whole or in part, is read by the processor, perhaps buffered, and is then executed. In this regard, when executing instructions associated with the monitoring system, the exemplary functionality described above with respect to monitoring systems may be performed.

It should be noted that any of the executable instructions, such as those depicted functionally in the accompanying flowcharts, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of embodiments of this disclosure can include embodying the functionality described in logic embodied in hardware or software-configured media.

It should be noted that the flowcharts included herein show the architecture, functionality and/or operation of implementations that may be configured using software. In this regard, each block can be interpreted to represent a module, segment, or portion of code, which comprises one or more executable instructions for implementing the specified logical function (s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

What is claimed is:

1. A method for protecting recorded content, the method comprising:
    receiving an information stream from a communication network, wherein the information stream is related to a real-time transaction between an agent and a party, and wherein the information includes video;
    recording the information stream;
    determining, by an electronic monitoring system, when during the real-time transaction the agent is expected to be provided with visual content that has been predetermined to be protected; and
    preventing unauthorized access to the visual content during replay of the recording by stopping the recording during a time in which the visual content that is to be protected is expected to be provided during the transaction and restarting the recording after the time has lapsed such that the visual content is not recorded.

2. The method of claim 1 wherein preventing the unauthorized access comprises modifying the visual content to produce modified visual content such that the modified visual content is unintelligible to a user unless the user possesses an authorization to access the visual content.

3. The method of claim 2 wherein modifying the visual content comprises masking the visual content.

4. The method of claim 2 wherein modifying the visual content comprises encrypting the visual content.

5. The method of claim 1 further comprising stitching together a portion of the recording that preceded the time in which the visual content is expected to be provided with a portion of the recording that succeeded the time in which the visual content is expected to be provided.

6. The method of claim 1 wherein the information stream includes audio, and wherein the method further comprises:
    predicting when during the real-time transaction the agent is expected to be provided with audio content that has been predetermined to be protected; and
    preventing unauthorized access to the audio content during replay of the recording by stopping the recording during a time in which the audio content that is to be protected is expected to be provided during the transaction and restarting the recording after the time has lapsed such that the audio content is not recorded.

7. The method of claim 1, wherein the communication network receives information from a workstation associated with the agent.

8. An electronic monitoring system for protecting recorded content comprising:
    a communication interface configured to receive an information stream from a communication network, wherein the information stream is related to a real-time transaction between an agent and a party and wherein the information includes video; and
    an electronic processor configured to record the information stream, to determine when during the real-time transaction the agent is expected to be provided with visual content that has been predetermined to be protected, and to prevent unauthorized access to the visual content during replay of the recording by stopping the recording during a time in which the visual content that is to be protected is expected to be provided during the transaction and restarting the recording after the time has lapsed such that the visual content is not recorded.

9. A system for protecting recorded content comprising:
    a recording system configured to receive an information system from a communication network and to record the information stream, wherein the information stream is related to a real-time transaction between an agent and a party, and wherein the information includes video; and
    an electronic monitoring system in communication with the recording system and configured to, to determine when during the real-time transaction the agent is expected to be provided with visual content that has been predetermined to be protected, and to prevent unauthorized access to the visual content during replay of the recording by requesting the recording system to stop the recording during a time in which the visual content that is to be protected is expected to be provided during the transaction and requesting the recording system to restart the recording after the time has lapsed such that the visual content is not recorded.

10. The monitoring system of claim 8 wherein the modified visual content comprised masked visual content.

11. The monitoring system of claim 8 wherein the modified visual content comprises encrypted visual content.

12. The monitoring system of claim 8, wherein the communication network receives information from a workstation associated with the agent.

13. A system for protecting recorded content comprising:
    a recording system configured to receive an information stream from a communication network and to record the information stream, wherein the information stream is related to a real-time transaction between an agent and a party, and wherein the information includes video; and
    a monitoring system in communication with the recording system and configured to, to determine when during the real-time transaction the agent is expected to be provided with visual content that has been predetermined to be protected, and to prevent unauthorized access to the visual content during replay of the recording by requesting the recording system to stop the recording during a time in which the visual content that is to be protected is expected to be provided during the transaction and requesting the recording system to restart the recording after the time has lapsed such that the visual content is not recorded.

14. The system of claim 13 wherein the monitoring system, to prevent the unauthorized access, modifies the visual content to produce modified visual content such that the modified visual content is unintelligible to a user unless the user possesses an authorization to access the visual content.

15. The system of claim 14 wherein to modify the visual content, the monitoring system masks the visual content.

16. The system of claim 14 wherein to modify the visual content, the monitoring system encrypts the visual content.

17. The system of claim 13 wherein the recording system is further configured to stitch together a portion of the recording that preceded the time in which the visual content is expected to be provided with a portion of the recording that succeeded the time in which the visual content is expected to be provided.

18. The system of claim 13 wherein the information includes audio, and wherein the monitoring system is further configured to predict when during the real-time transaction the agent is expected to be provided with audio content that has been predetermined to be protected, and to prevent unauthorized access to the audio content during replay of the recording by requesting the recording system to stop the recording during a time in which the audio content that is to be protected is expected to be provided during the transaction and requesting the recording system to restart the recording after the time has lapsed such that the audio content is not recorded.

19. The system of claim 13, wherein the communication network receives information from a workstation associated with the agent.

* * * * *